DAVID MUNSON'S
improvements in
LIGHTNING RODS.

74406

PATENTED FEB 11 1868

Witnesses
O. F. Mayhew
Wm L. Pyle

David Munson, Inventor.
Indianapolis, Indiana.

United States Patent Office.

DAVID MUNSON, OF INDIANAPOLIS, INDIANA.

Letters Patent No. 74,406, dated February 11, 1868.

IMPROVEMENT IN LIGHTNING-RODS.

*The Schedule referred to in these Letters Patent and making part of the same.*

TO ALL WHOM IT MAY CONCERN:

Be it known that I, DAVID MUNSON, of Indianapolis, in the county of Marion, and State of Indiana, have invented new and useful Improvements in Lightning-Rods; and I do hereby declare that the following is a full and exact description thereof, reference being had to the accompanying drawing, making part of this specification.

My invention relates to form of lightning-conductors, which combines compactness, great conducting surface and strength, with comparative cheapness, and which utilizes the conducting property of water, by its retention by capillary attraction, along the folds of the conductor, and which also aids to keep the earth moist around where the rod enters it, by conducting to it a considerable portion of the rain-water and dews that fall upon it.

Figure 1:
Figure 1 is a view of two sections of the rod in its simplest form, joined and secured together by means of the strap B.
Figure 2:
Figure 2 is a view of the rod twisted.
Figure 3:
Figure 3 is a section through one of the sections.
Figure 5:
Figure 5 is a section of rod with the centre fold made deeper than the others.

The rod is made of sheet copper, in sections of convenient length, and is formed in open folds, as shewn. The folds are laid close enough to retain, by capillary attraction, a portion of the rain-water and dews that fall upon the rod, in the inner angles of the folds, for the purpose of adding the conducting property of water to the conducting power of the rod. The folds also serve to convey the rain-water and dews that collect in them, to the ground, by which it is kept moist around where the rod enters it, and thus enhance the protective action of the rod. The rod may be twisted, as shown in fig. 2, but I prefer that it be left straight, as in fig. 1, for the reasons above mentioned. It may also be made with the central fold deeper than the others, as shown in fig. 5, which will give it a more unique appearance, and greater strength, as well as increased conducting surface. I also coat one surface of the rod with tin, in order to prevent its rapid oxidation, thereby preserving its conducting power, and rendering it more durable. I am thus enabled to use thinner sheet metal, and lessen the cost of the rod, without detracting from its conducting capacity. The rod may, however, be made from untinned sheet copper, if desired.

Figure 4:
Figure 4 is a section through the joint or lap of two sections, showing the mode of securing them together.

The sections A, of which the rod is composed, are fastened together by lapping their ends two or three inches, and passing a strap of sheet copper, B, through slots, pierced through the two sections in the folds, on each side of the centre one, and bringing the ends of the strap back around the edges, and bending them over the outside folds, as shown in section in fig. 4. After the strap is thus passed through and lapped around the folds, it is tightened by bending it into the fold, as at C, fig. 4, which brings the lapped ends of the sections closely and firmly together, making a substantial joint, and safe connection for the passage of the electric current. The rod may be made in any number of folds, and thus its conducting capacity enlarged to any desired extent.

Having thus fully described my invention, what I claim as new therein, and desire to secure by Letters Patent, is—

1. The lightning-conductor, made of sheet copper, tinned on one surface, and formed in flutes or folds, substantially as and for the purpose set forth.

2. Fastening the sections A together, by means of the strap B, in the manner substantially as set forth.

DAVID MUNSON.

Witnesses:
O. F. MAYHEW,
WM. L. PYLE.